(12) United States Patent
Burdis et al.

(10) Patent No.: US 9,152,001 B2
(45) Date of Patent: Oct. 6, 2015

(54) ELECTROCHROMIC DEVICES HAVING IMPROVED STRUCTURE FOR REDUCING CURRENT LEAKAGE ACROSS LOWER TRANSPARENT CONDUCTOR LAYERS

(71) Applicant: SAGE Electrochromics, Inc., Faribault, MN (US)

(72) Inventors: Mark Samuel Burdis, Faribault, MN (US); Jean-Christophe Giron, Edina, MN (US)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 113 days.

(21) Appl. No.: 13/950,791

(22) Filed: Jul. 25, 2013

(65) Prior Publication Data

US 2015/0029573 A1   Jan. 29, 2015

(51) Int. Cl.
   *G02F 1/153*   (2006.01)
   *G02F 1/155*   (2006.01)
   (Continued)

(52) U.S. Cl.
   CPC ............ *G02F 1/155* (2013.01); *G02F 1/0018* (2013.01); *G02F 1/0107* (2013.01);
   (Continued)

(58) Field of Classification Search
   CPC ......... G02F 1/163; G02F 1/155; G02F 1/153; G02F 1/157; G02F 1/161; G02F 1/1523; G02F 1/1533; G02F 1/15; G02F 2001/1519; G02F 2001/1515; G02F 2001/1555; G02F 1/1508; G02F 2001/1512; G02F 1/0018; G02F 1/133305; G02F 1/1339; G02F 2001/1676; G02F 1/0107; G02F 2203/01; G02F 2203/02

USPC .................................................. 359/265–275
See application file for complete search history.

(56) References Cited

U.S. PATENT DOCUMENTS

| 5,321,544 | A | 6/1994 | Parkhe et al. |
| 5,370,775 | A | 12/1994 | Parkhe |

(Continued)

FOREIGN PATENT DOCUMENTS

| WO | 2004068231 A1 | 8/2004 |
| WO | 2012007334 A1 | 1/2012 |
| WO | 2013090209 A1 | 6/2013 |

OTHER PUBLICATIONS

International Search Report & Written Opinion for Application No. PCT/US2014/011657 dated Apr. 25, 2014.

(Continued)

*Primary Examiner* — Evelyn A Lester
(74) *Attorney, Agent, or Firm* — Abel Law Group, LLP; Robert N Young (57) ABSTRACT

One object of the present invention is to provide an electrochromic device having improved insulating film structure to reduce electrical leakage. The improved structure includes a lower conductive layer, upper transparent conductive layer, an electrochromic electrode layer, a counter electrode layer, and at least one ion-conductor layer sandwiched between the electrochromic electrode layer and the counter electrode layer. The lower transport conductive layer is scribed and the gap formed from the scribing is filled with the layer(s) formed above the lower conductive layer, such as the electrode layer formed directly above the lower conductive layer. The effective linewidth of the scribe is greater than the migration length of the lithium ions intercalated into the electrode layer, such that the electrode materials occupying the gap do not convert the electrode layer into an electrically conductive region.

29 Claims, 5 Drawing Sheets

(51) Int. Cl.
*G02F 1/15* (2006.01)
*G02F 1/1333* (2006.01)
*G02F 1/157* (2006.01)
*G02F 1/161* (2006.01)
*G02F 1/1339* (2006.01)
*G02F 1/00* (2006.01)
*G02F 1/167* (2006.01)
*G02F 1/01* (2006.01)
*G02F 1/163* (2006.01)

(52) U.S. Cl.
CPC ........ *G02F 1/1339* (2013.01); *G02F 1/133305* (2013.01); *G02F 1/15* (2013.01); *G02F 1/153* (2013.01); *G02F 1/157* (2013.01); *G02F 1/1508* (2013.01); *G02F 1/1523* (2013.01); *G02F 1/1533* (2013.01); *G02F 1/161* (2013.01); *G02F 1/163* (2013.01); *G02F 2001/1512* (2013.01); *G02F 2001/1519* (2013.01); *G02F 2001/1555* (2013.01); *G02F 2001/1676* (2013.01); *G02F 2203/01* (2013.01); *G02F 2203/02* (2013.01)

(56) References Cited

U.S. PATENT DOCUMENTS

| | | | |
|---|---|---|---|
| 5,404,244 A | 4/1995 | Van Dine et al. | |
| 5,532,869 A * | 7/1996 | Goldner et al. | 359/275 |
| 5,659,417 A | 8/1997 | Van Dine et al. | |
| 5,699,192 A | 12/1997 | Van Dine et al. | |
| 5,724,175 A | 3/1998 | Hichwa et al. | |
| 5,724,177 A | 3/1998 | Ellis, Jr. et al. | |
| 7,193,763 B2 | 3/2007 | Beteille et al. | |
| 7,372,610 B2 | 5/2008 | Burdis et al. | |
| 7,593,154 B2 | 9/2009 | Burdis et al. | |
| 7,749,907 B2 | 7/2010 | Miyairi et al. | |
| 8,004,744 B2 | 8/2011 | Burdis et al. | |
| 8,043,796 B2 | 10/2011 | Akimoto | |
| 8,043,969 B2 | 10/2011 | Miyairi et al. | |
| 8,148,259 B2 | 4/2012 | Arai et al. | |
| 8,391,331 B2 | 3/2013 | Eichberger et al. | |
| 8,493,646 B2 * | 7/2013 | Burdis | 359/265 |
| 2003/0156313 A1 * | 8/2003 | Serra et al. | 359/265 |
| 2012/0019889 A1 | 1/2012 | Lamine et al. | |
| 2014/0253996 A1 * | 9/2014 | Burdis et al. | 359/265 |

OTHER PUBLICATIONS

U.S. Appl. No. 13/786,934, filed Mar. 6, 2013.
International Search Report and Written Opinion for Application No. PCT/US2014/047955 dated Oct. 13, 2014.
U.S. Appl. No. 14/095,308, filed Dec. 3, 2013.

* cited by examiner

ELECTROCHROMIC DEVICES HAVING IMPROVED STRUCTURE FOR REDUCING CURRENT LEAKAGE ACROSS LOWER TRANSPARENT CONDUCTOR LAYERS

BACKGROUND OF THE INVENTION

The present invention relates to electrochromic devices and more particularly relates to solid-state, inorganic thin film devices.

Electrochromic materials and devices have been developed as an alternative to passive coating materials for light and heat management in building and vehicle windows. In contrast to passive coating materials, electrochromic devices employ materials capable of reversibly altering their optical properties following electrochemical oxidation and reduction in response to an applied potential. The optical modulation is the result of the simultaneous insertion and extraction of electrons and charge compensating ions in the electrochemical material lattice.

Figure 1:
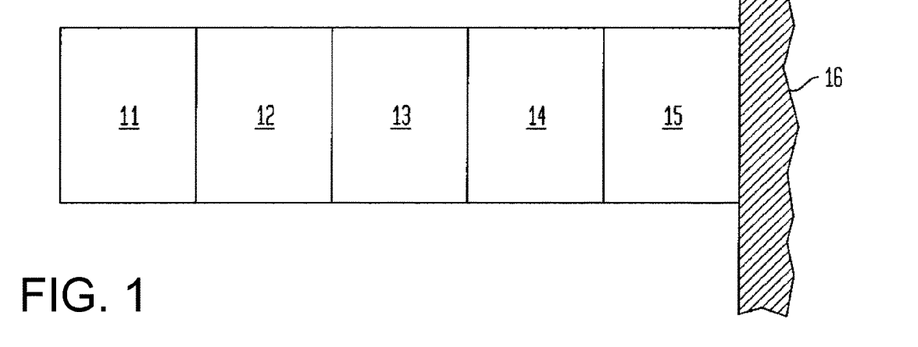
FIG. 1 is a schematic cross-section of a typical electrochromic device.

In general, electrochromic devices ("EC devices") have a composite structure through which the transmittance of light can be modulated. FIG. 1 illustrates a typical five layer solid-state electrochromic device in cross-section having the five following superimposed layers: an electrochromic electrode layer ("EC") 14 which produces a change in absorption or reflection upon oxidation or reduction; an ion conductor layer ("IC") 13 which functionally replaces an electrolyte, allowing the passage of ions while blocking electronic current; a counter electrode layer ("CE") 12 which serves as a storage layer for ions when the device is in the bleached or clear state; and two transparent conductive layers ("TCLs") 11 and 15 which serve to apply an electrical potential to the electrochromic device. Each of the aforementioned layers is typically applied sequentially on a substrate 16. Such devices typically suffer from intrinsic electronic leakage (between the electrochromic stack layers) and electronic breakdown.

Figure 2:
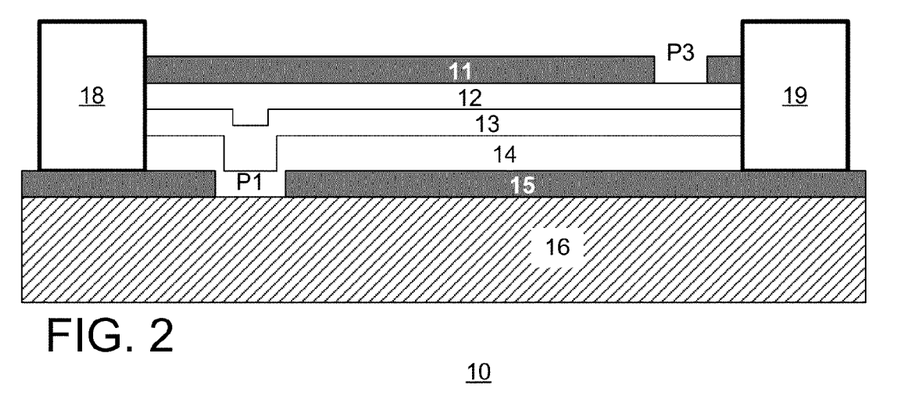
FIG. 2 is another schematic cross-section of a typical electrochromic device.

Typically, electrical power is distributed to the electrochromic device through busbars. FIG. 2 illustrates the electrochromic device of FIG. 1, in cross-section, having power supplied from two conductive elements, such as busbars 18 and 19. In order to prevent the busbars from shorting together, the busbars are electrically isolated from one another. Conventionally, this is done by scribing the TCLs 11 and 15. As shown in FIG. 2, the first (lower) TCL 15 is scribed at point P1, making the lower TCL 15 a discontinuous (i.e., physically separate) layer, and thereby preventing the busbars from shorting across the lower TCL 15. The width of the scribe at point P1 is typically on the order of 25 microns or wider, while the length varies based on the width the particular device being formed. Similarly, the second (upper) TCL 11 is scribed at point P3, making the upper TCL 11 also discontinuous, and thereby preventing the busbars from being shorted together across the upper TCL 11. Similar to the dimensions of the P1 scribe, the P3 scribe is typically on the order to 25 microns or wider, while the length varies based on the width the particular device being formed.

Figure 3:
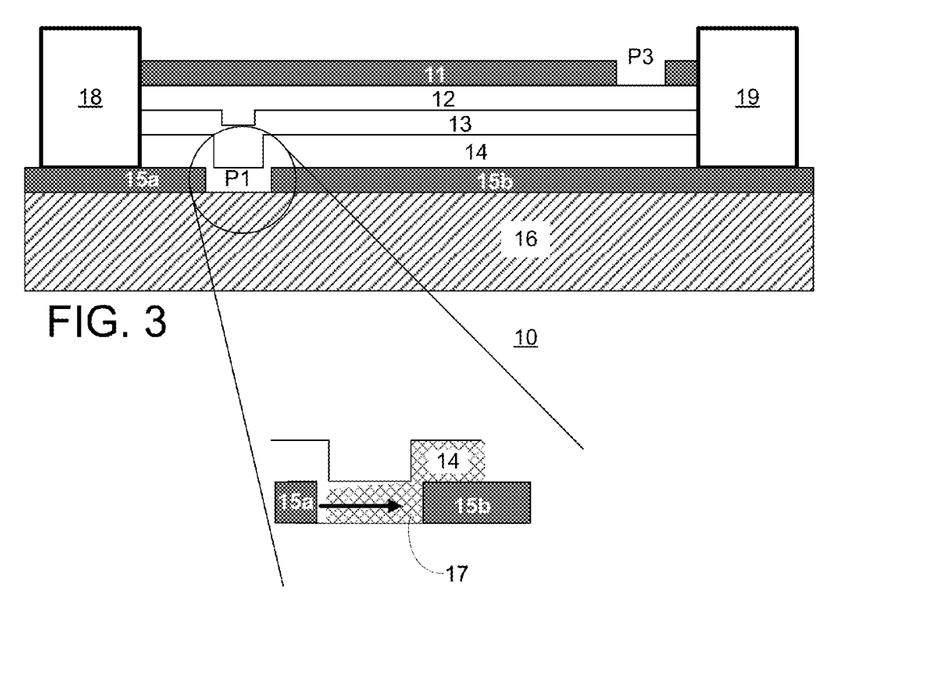
FIG. 3 is the schematic cross-section of FIG. 2 showing a close-up of a portion of the electrochromic device.

An intrinsic property of the EC layer 14 is that it becomes conductive when it transitions to a colored state. In other words, inserting electrons and charge compensating ions (such as lithium ions) into the EC material 14 leads to the material transitioning from an insulating state to a conductive state. This transition can happen upon the inserted (or "intercolated") electrons or charge compensating ions reaching a threshold concentration, whereupon the EC device transitions suddenly to a conductive state. Under ideal operation of the EC device, insertion of the charge compensating ions will not occur above the P1 scribe itself, as no electric field is generated there due to the absence of the lower transparent conductive layer. However, it is possible that charge compensating ions can migrate laterally (i.e., sideways in FIG. 2) in the layer according to the usual laws of diffusion. Moreover, when a threshold concentration of charge compensating ions migrate laterally into a material, the material becomes conductive. The distance that the threshold concentration of charge compensating ions are capable of diffusing laterally will hereinafter be termed the "migration length." Should the migration length meet or exceed the P1 scribe width, a conductive region can form in the area of the P1 scribe. Furthermore, if the conductive region extends across the full width of the P1 scribe, the two portions 15a and 15b of the lower TCL 15 may be conductively connected by the conductive region. For example, as shown in FIG. 3, the portion of the EC layer 14 may be colored for a reasonable amount of time. During this time, lithium can diffuse laterally across the P1 scribe, converting the EC layer 14 in that area 17 from an insulating layer to a conducting layer. If the scribed channel between the two portions 15a and 15b of the lower TCL 15 is not wide enough, current may pass between these portions, thereby electrically shorting the busbars 18 and 19 together. Moreover, once the leakage path is completed, the area 17 cannot simply be converted back from a conducting region to an insulating region, since clearing the electrochromic device 10 will not apply an electric field to that region of the device 10 in order for it to bleach (i.e., transition from a colored state to a non-colored state or a less colored state).

Furthermore, in order to produce electrochromic devices in a more cost effective manner, it is necessary to modify the deposition process to provide for higher yields and to be more amenable to mass production. In general, the yield can be considered to be reduced every time a substrate or other workpiece is cycled between vacuum and atmosphere and vice versa. It is believed that this may be caused by dust and debris from the coating process, which is inevitably present in sputtering and which may be 'blown' around during venting and pumpdown, finding its way onto the active layers, leading to potential defects in the film structure, such as short circuits or "shorts." Thus, depositing all of the layers in one single continuous vacuum step, i.e., one coating machine, would achieve a high yield. However, to produce the structure shown in FIG. 3, depositing all the layers in a single vacuum step would require including a laser scribe (or cut of some type) between the deposition of the lower transparent conductor and the deposition of the second transparent conductor in the same vacuum system. Such cutting processes are very difficult in a vacuum system. For instance, with regard to laser scribing, it is necessary to maintain an extremely tight focus for the laser. Such focus is very difficult to achieve efficiently with the mechanical tolerances present in typical commercial sputtering systems.

It is desirable to reduce the amount of electronic leakage between the portions of the transparent conducting layers of the electrochromic device while maintaining as high a yield as possible (e.g., conducting as few scribing steps during the cutting process as possible).

BRIEF SUMMARY OF THE INVENTION

One aspect of the disclosure provides an electrochromic device including a lower transparent conductive layer. A first portion of the lower transparent conductive layer may be coupled to a first conductive element. A second portion, physically separate from the first portion, of the lower transparent conductive layer may be coupled to a second conductive element. The electrochromic device may also include an upper transparent conductive layer. A first portion of the upper transparent conductive layer may be coupled to the first conductive element. A second portion, physically separate from the first portion, of the upper transparent conductive layer may be coupled to the second conductive element.

The electrochromic device may also include a first electrode layer comprising one of a counter electrode layer and an electrochromic layer. The first electrode layer may be between the lower transparent conductive layer and the upper transparent conductive layer, and may be in contact with each of the first portion and the second portion of the lower conductive layer. The electrochromic device may also include a second electrode layer comprising the other of the counter electrode layer and the electrochromic electrode layer. The second electrode layer may also be between the lower transparent conductive layer and the upper transparent conductive layer.

The electrochromic device may further include an ion-conductor layer for conducting ions between and in communication with the first electrode layer and the second electrode layer.

The first portion and second portion of the lower transparent conductive layer may be spaced apart more than the migration length, which is defined in greater detail herein. In some embodiments, the first portion and second portion of the lower transparent conductive layer may be spaced more than about 25 microns apart. In some embodiments, they may be spaced more than about 50 microns apart. In some embodiments, they may be spaced more than about 75 microns apart.

In some embodiments, the space between the first portion and second portion of the lower transparent conductive layer may be filled at least partially by the first electrode layer. In some embodiments, the space between the first portion and second portion of the lower transparent conductive layer may filled at least partially by a third portion of the lower transparent conductive layer that is electrically isolated from each of the first portion and the second portion of the lower transparent conductive layer. The first portion and third portion of the lower transparent conductive layer may then spaced more than about 25 microns apart, and the second portion and third portion of the lower transparent conductive layer may also be spaced more than about 25 microns apart. Thus, the first portion and second portion of the lower transparent conductive layer may be spaced more than about 50 microns apart. In some embodiments, the first portion and second portion of the lower transparent conductive layer may be spaced more than about 75 microns apart. The respective spaces between the first portion and third portion, and between the second portion and the third portion, of the lower transparent conductive layer may each be filled at least partially by the first electrode layer.

In some embodiments, the first conductive electrode layer may comprise a first portion coupled to the first conductive element and to the first portion of the lower transparent conductive layer, and a second portion, physically separate from the first portion, coupled to the second conductive element and to the second portion of the transparent conductive layer. The first portion and second portion of the lower transparent conductive layer may be spaced apart more than the first portion and second portion of the first electrode layer are spaced apart. The space between the first portion and second portion of the lower transparent conductive layer may be filled at least partially by the ion conductor layer. The space between the first portion and second portion of the first electrode layer is filled at least partially by the ion conductor layer.

In some of the above embodiments, the counter electrode layer may comprise a mixed tungsten nickel oxide. In some further embodiments, the counter electrode layer may comprise lithium ions.

Another aspect of the invention provides a method for the preparation of an electrochromic device. The method may include providing a first conductive layer, cutting the first conductive layer such that a first portion of the first conductive layer is electrically isolated from a second portion of the first conductive layer, depositing one of an electrochromic electrode layer and a counter electrode layer on said first conductive layer, thereby providing a first deposited electrode that is occupied by a charge compensating ion having a diffusion length that is shorter than the space between the first portion and second portion of the first conductive layer, depositing an ion-conductor layer on the first deposited electrode, such that said ion transparent layer is in communication with the first deposited electrode, depositing the other of the electrochromic electrode layer and said counter electrode layer on the ion-conductor layer, thereby providing a second deposited electrode, and depositing a second conductive layer on the second deposited electrode.

The first deposited electrode may be deposited over the first and second portions of the first conductive layer, and the first and second portions may be spaced more than about 25 microns apart. In some embodiments, they may be spaced more than about 50 microns apart. In some embodiments, they may be spaced more than about 75 microns apart.

The first deposited electrode may be deposited over the first and second portions of the first conductive layer such that the space between the first portion and second portion of the first conductive layer is filled at least partially by the first deposited electrode.

In some embodiments, the method may further include cutting the second portion of the first conductive layer such the first conductive layer is divided into three electrically isolated portions, one of the portions being a middle portion positioned between the other two outer portions. The space between the middle portion and each of the outer portions may be filled at least partially by the first electrode layer.

The first cutting step may be performed before the first electrode layer is deposited on the first conductive layer. The second cutting step may be performed after the first electrode layer is deposited on the first conductive layer such that first electrode layer comprises a first portion coupled to the first portion of the first conductive layer, and a second portion, physically separate from the first portion, coupled to the second portion of the first conductive layer, and such that the first portion and second portion of the first conductive layer are spaced apart more than the first portion and second portion of the first electrode layer are spaced apart. The space between the first portion and second portion of the first conductive layer may be filled at least partially by the ion conductor layer. In some embodiments, the space between the first portion and second portion of the first electrode layer may be filled at least partially by the ion conductor layer.

DETAILED DESCRIPTION

One object of the present invention is to provide an electrochromic device having improved insulating film structure to reduce electronic leakage (e.g., between electrically isolated portions of a transparent conductor layer). The disclosed electrochromic devices are formed using a deposition process having either two or three coating processes with either one or two laser processing steps, respectively, between them (not including laser scribing processing steps that may be performed subsequent to the deposition process). The disclosed devices and processes therefore involve minimal vacuum cycling, thereby potentially increasing yield. These and other objectives are realized by means of an electrochromic device utilizing a transparent conductor layer having a wider, or effectively wider, channel width at location P1.

Yet another objective of the present invention is to provide a method of preparing an electrochromic device comprising the improved insulating film structure.

Yet another objective of the present invention is to provide a method of preparing an improved insulating film structure for use in electrochromic devices.

Figure 4:
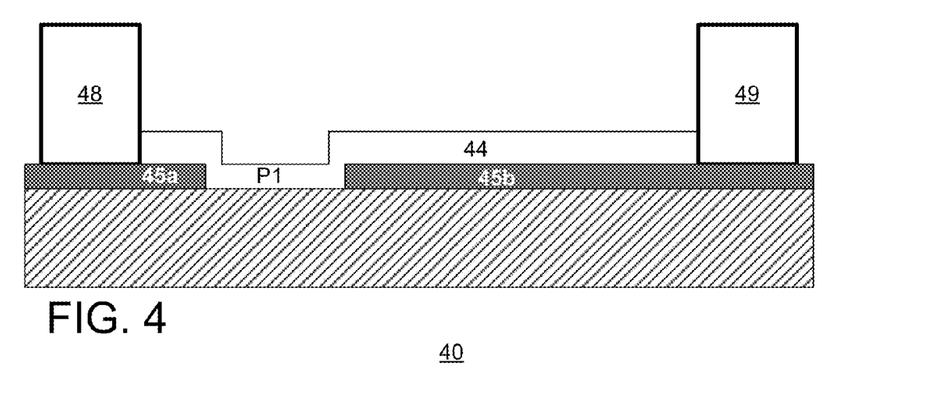
FIG. 4 is a schematic cross-section of part of an electrochromic device having an improved structure in accordance with an embodiment of the current invention.

In accordance with the present invention, FIG. 4 illustrates a portion of a solid-state electrochromic device 40, in cross-section, having an improved insulating film structure. The device 40 of FIG. 4, when complete, is similar to the solid-state device depicted in FIGS. 1 and 2 to the extent that each of the aforementioned EC, IC, CE, and upper TCL layers, 11-14 are also present in the device of FIG. 4. The device of FIG. 4, when complete, differs from the device depicted in FIGS. 1 and 2 to the extent that the P1 scribe at location P1 is wider than the P1 scribe of FIGS. 1 and 2. For example, the linewidth of the P1 scribe is greater than about 25 microns. In some examples, the linewidth may be greater than about 50 microns, and in further examples, the linewidth may be greater than about 75 microns. The left and right portions of the lower transparent conductor layer, 45a and 45b respectively, are thus separated by a wide P1 scribe positioned at location P1 of the device.

Ideally, the resistance across location P1 would be infinite so as to electrically isolate the two portions 45a and 45b of the lower transparent conductor layer 45. Practically speaking, the resistance R may be calculated using the formula below:

$$R = \frac{W}{C * A}$$

where C is the conductivity of the EC layer, W is the linewidth of the scribe, and A is the area of the scribe, which is the scribe length (which is determined by the width of the device measured parallel to the scribe) multiplied by the thickness of the EC film. As is evident from the formula, increasing the linewidth of the scribe in turn increases the resistance at location P1 between the lower TCL portions 45a and 45b.

Similar to the structure of the device of FIG. 2, the EC layer 44 of the device of FIG. 4, fills in the gap, either completely or partially, formed by the P1 scribe. As such, the channel separating the lower TCL portions 45a and 45b is filled with materials that are not electrically conductive. Specifically, the linewidth of the channel is chosen such that it is greater than the migration length of the lithium ions in the EC layer 44. In other words, the linewidth of the channel is chosen to be wider than the distance that the charge compensating ions in the EC layer 44 are capable of diffusing sideways. This ensures that a conductive path extending from one portion of the TCL 45a to the other portion 45b is not formed in the EC layer 44 when the electrochromic device 40 is held in a colored state for a significant amount of time.

Figure 5:
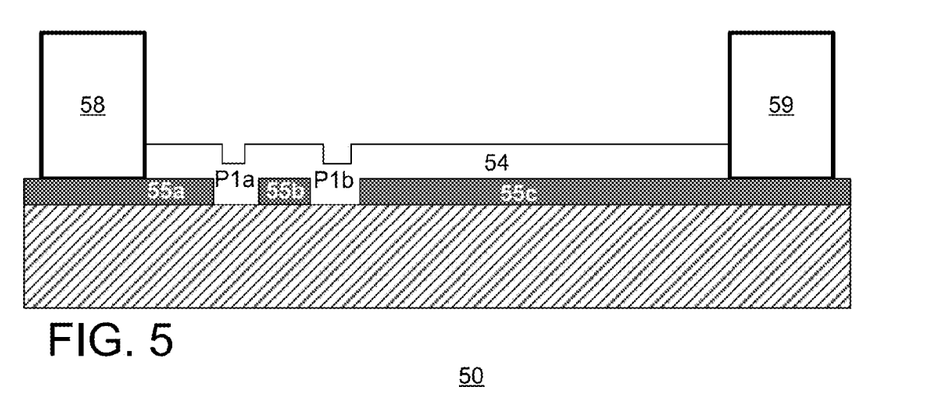
FIG. 5 is a schematic cross-section of part of another electrochromic device having an improved structure in accordance with another embodiment of the current invention.

In some embodiments, the effective linewidth of location P1 may be increased without increasing the number of cuts made in the lower TCL. For example, FIG. 5 illustrates a cross-section of a portion of yet another solid-state electrochromic device 50 also, when completed, having an insulating film structure also improved upon the structure of the device of FIGS. 1 and 2. The device 50 of FIG. 5 is similar to the solid-state device 40 depicted in FIG. 4 to the extent that each of the aforementioned layers (i.e., layers 11-14 of FIG. 2) are formed on top of the lower TCL 55 of the portion of the device 50 shown in FIG. 5. The device 50 of FIG. 5 differs from that of FIG. 4 to the extent that the device 50 of FIG. 5 includes a doublet, two isolated scribes in the lower TCL 55. In the device 50 of FIG. 5, the lower TCL 55 is divided into three sections: left section 55a which is electrically connected to a first busbar 58, right section 55c which is electrically connected to a second busbar 59, and middle section 55b which is electrically isolated from the left section 55a by a first scribe P1a, and is electrically isolated from the right section 55c by a second scribe P1b. The formation of the doublet depicted in FIG. 5 has the same effect as making a fully depleted line across the P1 location (i.e., fully cutting the middle section 55b out of the device 50).

Again, the EC layer 54 fills in the gaps, either completely or partially, formed by the P1a and P1b cuts. As such, the channel separating the lower TCL left and middle sections 55a and 55b, as well as the channel separating the middle and right sections 55b and 55c, are each filled with materials that are not electrically conductive. Specifically, the effective linewidth of the doublet is chosen such that it is greater than the migration length of the lithium ions occupying the EC layer 54. This ensures that a conductive path extending from the left section of the TCL 55a to the right section 55c is not formed in the EC layer 54 when the electrochromic device 50 is held in a colored state for a significant amount of time.

In the example of FIG. 5, each of the gaps may be very narrow (e.g., 10 microns wide, 5 microns wide, or even less) provided that each gap completely severs the lower TCL and that the distance between the left section 55a and right section 55c of the lower TCL is greater than the migration length of the conducting ions in the EC layer. Practically speaking, it is believed to be aesthetically desirable to keep this distance relatively short so as to minimize the non-coloring area of the EC device 50 and maintain a more visually pleasing appearance when the device is in a darkened state.

Figure 6:
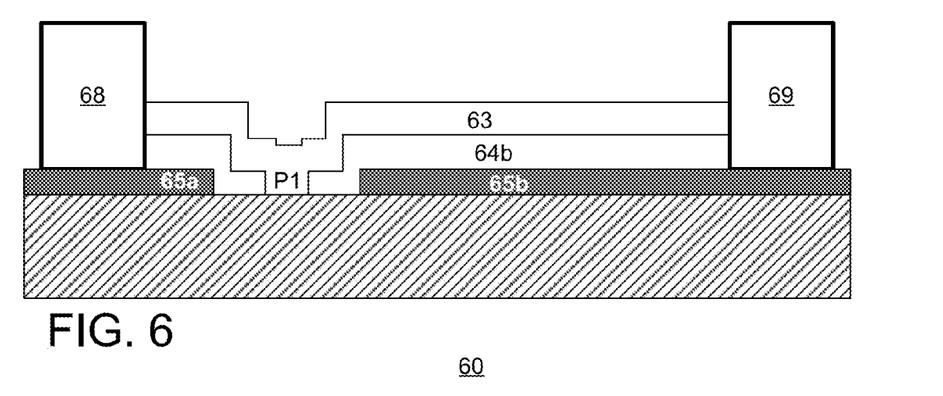
FIG. 6 is a schematic cross-section of part of another electrochromic device having an improved structure in accordance with yet another embodiment of the current invention.

In some embodiments, the TCL portions may further be electrically isolated from one another by cutting the EC layer at location P1. For example, FIG. 6 illustrates a cross-section of a portion of yet another solid-state electrochromic device 60 also, when completed, having an insulating film structure improved upon the structure of the device of FIGS. 1 and 2. The device 60 of FIG. 6 is similar to the solid-state device 40 depicted in FIG. 4 to the extent that each of the aforementioned upper TCL, CE, and IC layers (i.e., layers 11-13 of FIG. 2) are formed on top of the lower TCL 65 of the portion of the device 60 shown in FIG. 6. The device 60 of FIG. 6 differs from that of FIG. 4 to the extent that the EC layer 64 of device 60 is cut into portions 64a and 64b, each portion electrically isolated from the other, at location P1. The left portion 64a of the EC layer is electrically connected to the first busbar 68 and to the left portion of the lower TCL 65a. The right portion 64b of the EC layer is electrically connected to the second busbar 69 and the right portion of the upper TCL 65b. The cut separating the portions of the EC layer 64 is narrower (has a smaller linewidth) than the cut separating the portions of the lower TCL 65 underneath. Due to the additional cut through the EC layer 64, the channel between the left and right portions of the lower TCL 65 is filled only partially with the EC layer 64. The remainder of the channel is filled with the insulating IC layer 63.

The cut separating the portions of the EC layer 64 may be narrower than the migration length of the conductive ions in the EC layer. For example, the cut may be about 10 microns, about 5 microns, or even narrower. Effectively, there is no minimum for the width of this cut, so long as it fully severs the layer deposited underneath. This is because the second results in the formation of an EC layer/IC layer (or EC layer/CE layer) interface that functions essentially like a "blocking" contact between the separated portions of the lower TCL. This interface is believed to behave more like a diode than a resistance and is therefore much more effective at blocking migration of the conducting ions, even along a distance shorter than the migration length.

Also provided are methods of fabricating an electrochromic device having an improved yield and increased performance as described herein. The composition or type of layers which are deposited may be varied in order to achieve the desired results without departing from the teachings of the present invention.

Figure 7:
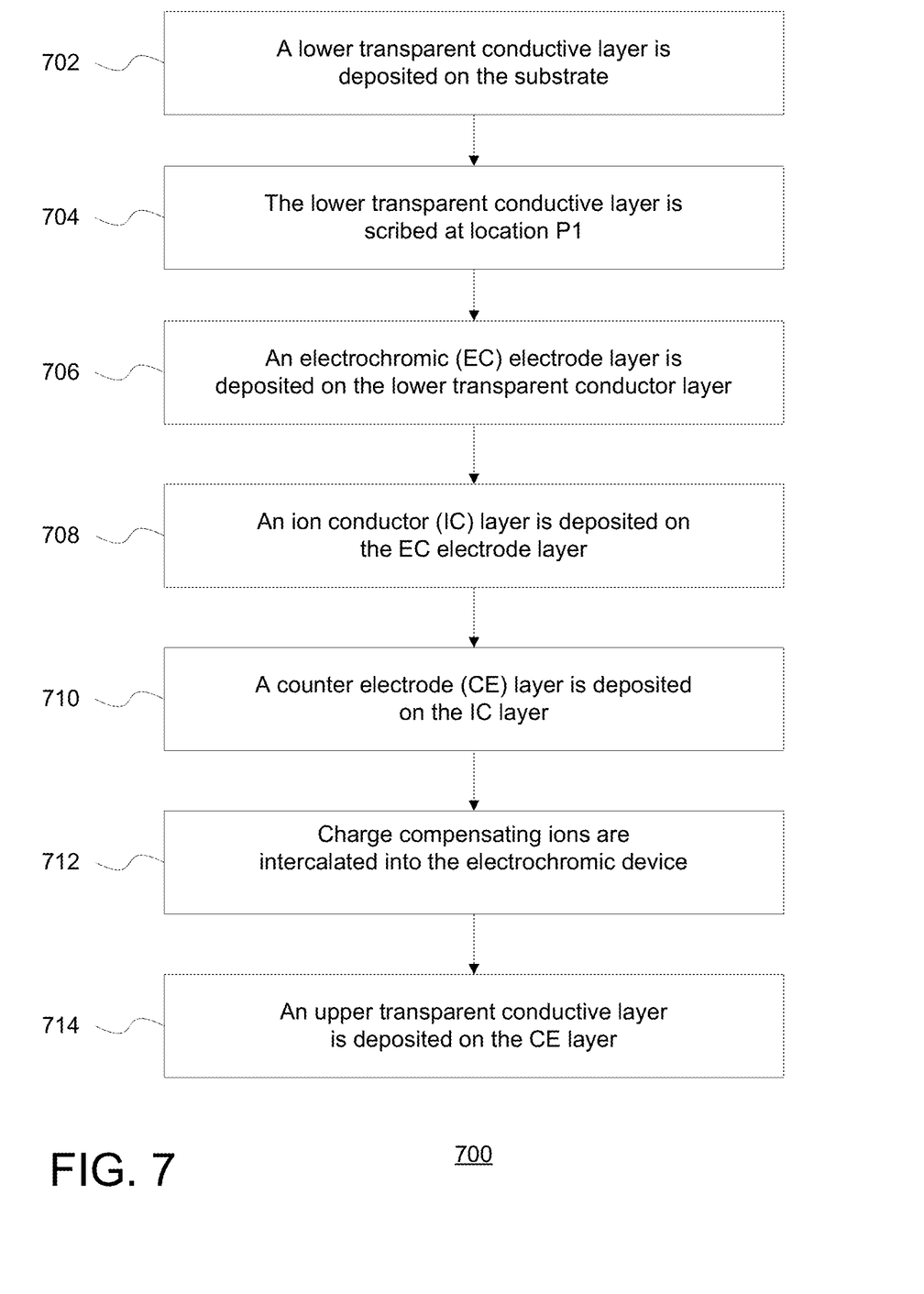
FIG. 7 is a flow chart depicting a process for forming an electrochromic device in accordance with an embodiment of the current invention.

FIG. 7 provides a flow diagram 700 that illustrates a process by which the device 40, a portion of which is shown in FIG. 4, and device 50, a portion of which is shown in FIG. 5, may be formed in their entirety. At block 702, a lower transport conductive layer is deposited onto a substrate such that the lower transport conductive layer extends continuously from the first busbar to the second busbar. In a preferred embodiment, the materials comprising a conductor layer are deposited via sputtering onto a transparent substrate to form a first transparent conductor layer.

At block 704, the lower transport conductive layer is scribed or cut at location P1. The scribe may be accomplished using one of several different methods, including laser scribing, etching, mechanical abrading or other suitable removing processes known in the art ("cutting").

The cutting may be performed in a variety of different ways and/or methods, such as by use of a suitable masking, scribing or etching processes that utilize one or more of a laser, a mechanical abrasion process involving, for example, use of a diamond, ruby or stainless steel tip, electrical discharge machining, or chemical etching.

In the example of FIG. 4, the linewidth of the cut may be significantly increased by performing multiple cuts one next to another. In the example of FIG. 5, the linewidth may be effectively increased by performing two or more cuts spaced apart from each other such that the material remaining from the TCL between the two or more cuts is electrically isolated from both the first and second busbars of the device.

At block 706, an electrochromic (EC) electrode layer (also called the "first electrode" herein), is then deposited on the lower TCL such that the EC layer extends continuously from the first busbar to the second busbar.

In preferred embodiments, the first electrode is deposited via intermediate frequency reactive sputtering or DC sputtering techniques. In some embodiments, the first electrode layer is deposited on a heated lower transparent conductor layer.

At block 708, an ion conductor layer is then deposited on the electrochromic electrode layer such that the ion conductor layer extends continuously from the first busbar to the second busbar. As described in U.S. Pat. Nos. 7,372,610 and 7,593,154, the disclosures of which are hereby incorporated by reference in its entirety herein, the ion conductor layer may be comprised of a solid electrolyte capable of allowing ions to migrate through the layer. The ion conductor layer must have a sufficient ionic transport property to allow ions, preferably lithium ions, to migrate through. Any material may be used for an ion conductor provided it allows for the passage of ions from the CE layer to the EC layer. In some embodiments, the ion conductor layer comprises a silicate-based structure. In other embodiments, suitable ion conductors particularly adapted for lithium ion transmission include, but are not limited to, lithium silicate, lithium aluminum silicate, lithium aluminum borate, lithium borate, lithium zirconium silicate, lithium niobate, lithium borosilicate, lithium phosphosilicate, lithium nitride, lithium aluminum fluoride, and other such lithium-based ceramic materials, silicas, or silicon oxides. Other suitable ion-conducting materials can be used, such as silicon dioxide or tantalum oxide. Preferably, the ion conductive layer has low or no electronic conductivity. The preferred ion conductor material is a lithium-silicon-oxide produced by either sputtering or a sol-gel process.

In some preferred embodiments, the ion conductor layer is deposited by intermediate frequency reactive sputtering or DC sputtering techniques. In other preferred embodiments, the ion conductor layer is deposited by sol-gel thin film deposition techniques including dip coating, spin coating and spray coating. In yet other preferred embodiments, the ion conductor layer is deposited by sputtering or by sol-gel techniques. The procedures for depositing such layers by sputtering or sol-gel coating are known to those skilled in the art.

At block 710, a counter electrode (CE) layer (also called a "second electrode" layer herein), is then deposited on the ion conductor layer such that the CE layer extends continuously from the first busbar to the second busbar. The CE layer may be an anodic complementary CE layer, such as mixed tungsten-nickel oxides, and preferably substantially crystalline mixed tungsten-nickel oxides, as described in U.S. Pat. No. 7,372,610, the disclosure of which is hereby incorporated by reference in its entirety herein. Complementary CE layers may comprise a charge compensating ion, such as lithium. The charge compensating ion may be at least partially intercalated within the mixed tungsten-nickel oxide, and/or present as a film at least partially coating the surface of the CE layer. The charge compensating ion is capable of being reversibly transferred from the CE layer to the EC layer when an appropriate electrical potential is applied.

In some embodiments where a mixed tungsten-nickel oxide film is deposited, the deposited film is reduced through the deposition of lithium. The deposition of the lithium is achieved through one of either wet chemical methods, sol-gel, chemical vapor deposition, physical vapor deposition, or non-reactive sputtering. In a preferred embodiment, the source of the lithium deposited on the tungsten-nickel oxide film is lithium metal deposited in vacuum using a non-reactive sputtering process. In one embodiment, the amount of lithium deposited on the anodic mixed tungsten-nickel oxide film is carefully controlled such that an amount of lithium is added that allows for the greatest transmission of light through the CE layer, and hence the whole device.

Returning to the flow diagram 700 of FIG. 7, at block 712, charge compensating ions such as protons (Fr), lithium ions ($Li^+$), or sodium ions ($Na^+$), are intercalated into the electrochromic device. As used herein, the term "intercalation" means the reversible insertion of a molecule, atom or ion into the lattice of an electrochromic device layer. In preferred embodiments of the current invention, the charge compensating ion is lithium. In some exmaples, the lithium ions are deposited by magnetron sputter deposition of atomic lithium from a metallic sputter target into the device, under vacuum processing conditions. In other examples, a lithium oxide or lithium carbonate may be deposited in place of metallic lithium using any known means of deposition (e.g., sputtering, etc.). Typically, the intercalation step occurs after the deposition of one or both of the electrode layers. The amount of charge compensating ion deposited is carefully controlled such that an amount of charge compensating ion is added that maximizes the dynamic range of the electrochromic device.

Lastly, at block 714, an upper transparent conductive layer is deposited on the counter electrode layer by methods well known in the art and as described above in the deposition of the first transparent conductive layer.

In some embodiments, all of the layers comprising the electrochromic device are deposited via magnetron sputter deposition in the same vacuum processing chamber so as to increase device fabrication manufacturability, meaning that the yields are likely to be improved as a result of reduced handling, and the throughput is also likely to be increased as a result of fewer processing steps. Moreover, depositing all of the layers in the same chamber would result in a reduction in the number of shorts.

The transparent conductor, EC, IC, and CE layers may be deposited by any technique known in the art including wet chemical methods, chemical vapor deposition, or physical vapor deposition. Preferred methods of deposition include sol-gel, spray pyrolysis, electrodeposition, metallo-organic decomposition, laser ablation, pulsed laser ablation, evaporation, e-beam assisted evaporation, sputtering, intermediate frequency reactive sputtering, RF sputtering, magnetron sputtering, DC sputtering, reactive DC magnetron sputtering and the like.

The heat treatment process is believed to have a positive effect on the switching characteristics of the electrochromic device, as well as improving the conductivity and transparency of the second electrode layer (i.e., the electrode layer adjacent to the upper TCL). The heat treatment also is believed to have the effect of increasing the transmission of the lithiated CE layer.

Figure 8:
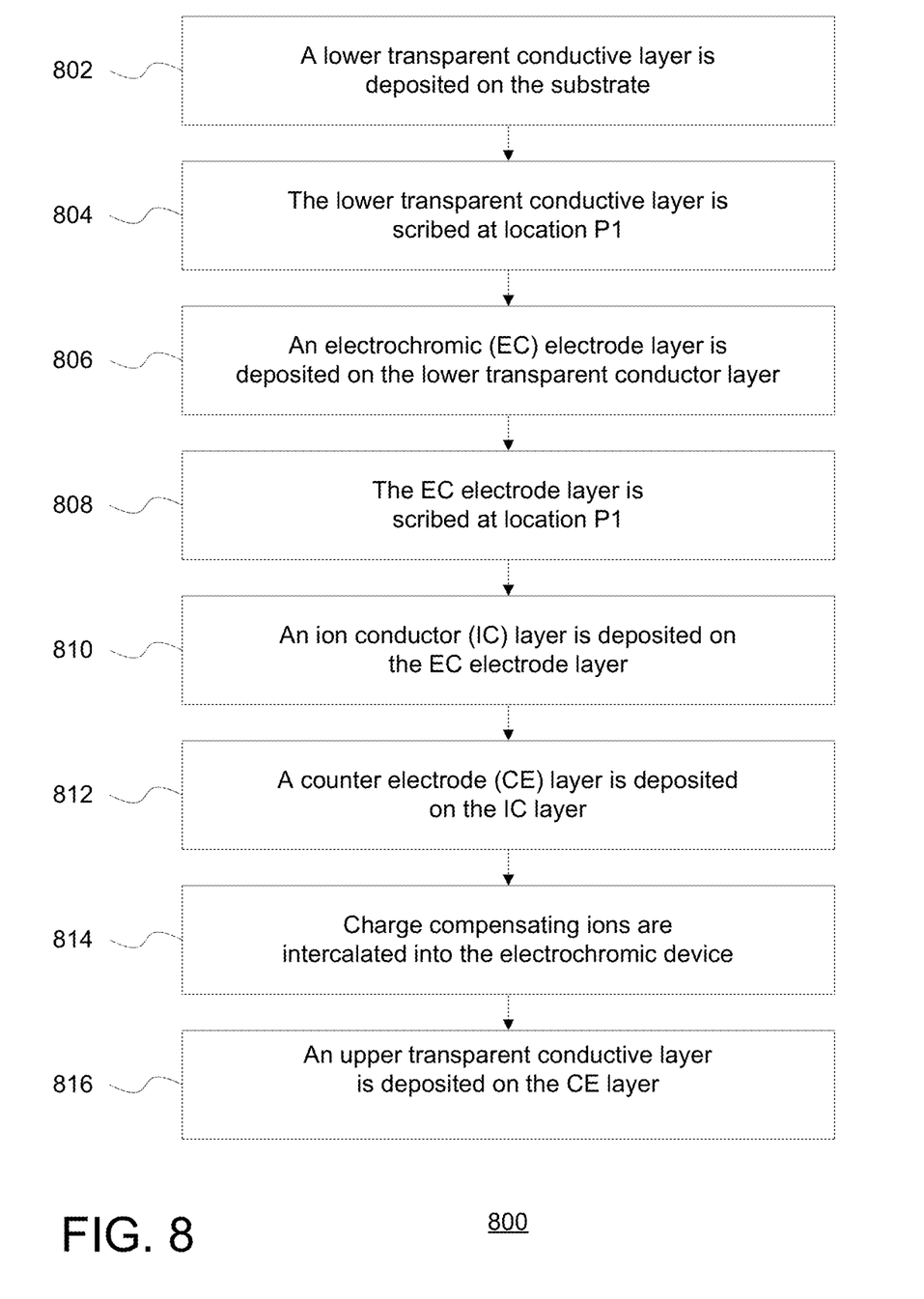
FIG. 8 is a flow chart depicting a process for forming an electrochromic device in accordance with an embodiment of the current invention.

Flow diagram 800 illustrates a process by which the device 60, a portion of which is shown in FIG. 6, may be formed in its entirety. The steps described in blocks 802-806, and 810-816 are respectively comparable to steps 702-714 described in connection with flow diagram 700 and are therefore not repeated here. Flow diagram 800 includes an additional step, block 808. At block 808, the EC layer is scribed or cut at location P1, above the scribe in the lower transparent conductor layer underneath the EC layer. The EC layer scribe may have a narrower linewidth than the lower TC layer scribe, such that only a portion of the EC layer materials deposited at and occupying the channel between the lower TC layer portions at location P1 are scribed, while some of the EC layer materials remain deposited in the channel.

Thus, in the examples of FIG. 4 and FIG. 5, the forming of which is illustrated by steps 702-706 of flow chart 700, the channel formed through the P1 cut is filled by the EC layer. To prevent a conductive path spanning the width of the channel from forming in the EC layer when the device is held in a colored state for a significant period of time, the linewidth of the channel is chosen to exceed the migration length of the lithium ions (which, as described above, are intercalated into the device). By contrast, in the example of FIG. 6, the forming of which is illustrated by steps 802-810 of flow chart 800, the channel formed in the TCL is filled partly by the EC layer and partly by the IC layer above the EC layer. Unlike the EC layer, the IC layer does not become conductive when the device is held in a colored state. The channel formed at location P1 therefore cannot become completely conductive. As a result, the channel between the left and right portions 65a and 65b of the TCL (i.e., the linewidth of the first P1 scribe formed at block 804) of FIG. 6 need not necessarily be as wide as that of the channel formed between the left and right portions of the TCLs of either FIG. 4 or FIG. 5 in order to prevent shorting of the lower TCL.

Each of the layers included in the devices 40, 50, and 60 may be formed using the materials and techniques described in U.S. Pat. No. 8,004,744, and concurrently pending application Ser. No. 13/786,934, which is entitled "Laser Cuts to Reduce Electrical Leakage," the disclosures of which are hereby incorporated by reference herein in their entirety. The layers of the devices may be formed sequentially, beginning with the bottom TCL and working upward to the upper TCL.

In some embodiments, one or more optical tuning layers may be deposited above the upper TCL, as described more fully in U.S. Pat. No. 5,724,177, the disclosure of which is hereby incorporated by reference in its entirety herein. For instance, optical tuning layers may be used in combination with conductive metal layers and preferably have a thickness between about 10 nm and about 50 nm, and more preferably between about 23 nm and about 40 nm. Preferred materials for forming optical tuning layers have an index of refraction which is greater than about 1.9, and more preferably between about 1.9 and about 2.8. In some embodiments, the index of refraction and thickness of an optical tuning layer may be selected using the following method. The desired index of refraction may be determined by multiplying the index of refraction of the glass substrate by the index of refraction of the transparent conductive layer and taking the square root of the product. The thickness of optical tuning layer 61 is then determined by dividing the visible light wavelength (e.g., 540 nm) by the calculated index of refraction. Preferably, the thickness of optical tuning layer is about 75 nm.

In one example, the glass substrate has an index of refraction of 1.5, the first optical tuning layer has an index of refraction of about 1.77 and a thickness of about 75 nm, the lower transparent conductive oxide layer has an index of refraction of about 2.1 and a thickness of about 450 nm, the electrochromic electrode layer has an index of refraction of about 2.1 and a thickness of about 400 nm, the ion conducting layer has an index of refraction of about 1.5 and a thickness of about 200 nm, the counter electrode layer has an index of refraction of about 2.0 and a thickness of about 200 nm, the upper transparent conductive layer has an index of refraction of about 2.1 and a thickness of about 450 nm, and the second optical tuning layer has an index of refraction of about 1.77 and a thickness of about 75 nm. A glass superstrate and a laminate layer for adhering a glass superstrate to the optical tuning layer, each having an index of refraction of about 1.5, may also be provided.

In another example, the glass substrate has an index of refraction of about 1.5, the first optical tuning layer has an index of refraction of about 2.1 and a thickness of about 20 nm, the second adjacent optical tuning layer has an index of refraction of about 1.5 and a thickness of about 29 nm, the lower transparent conductive layer has an index of refraction of about 2.1 and a thickness of about 450 nm, the electrochromic electrode layer has an index of refraction of about 2.1 and a thickness of about 300 nm, the ion conducting layer has an index of refraction of about 2.0 and a thickness of about 200 nm, the counter electrode layer has an index of refraction of about 2.0 and a thickness of about 200 nm, the upper transparent conductive layer has an index of refraction of about 2.1 and a thickness of about 450 nm, the laminate layer has an index of refraction of about 1.5, and the glass superstrate has an index of refraction of about 1.5.

In some further examples, the lower transparent conductive layer may be optically tuned by the use of two or more optical tuning layers selected so that the indices of refraction of the various layers gradually increase from the index of refraction of substrate to the index of refraction of the lower transparent conductive layer. In that regard, the optical tuning layers may be two or more layers of monotonically increasing index of refraction. For example, for a device including a glass substrate having an index of refraction of about 1.5 and a lower transparent conductive layer having an index of refraction of about 1.9, the first optical tuning layer will desirably have an index of refraction of about 1.62 ($(1.5^2 \times 1.9)^{1/3}$), and the second optical tuning layer will desirably have an index of refraction of about 1.76 ($(1.5 \times 1.9^2)^{1/3}$). The thicknesses of layers are desirably about 60 nm and 53 nm, respectively, as determined by optical modeling to achieve maximum transmission. Where desirable, a series of more than two adjacent optical tuning layers may be used to further enhance the optical tuning affect.

In each of the above described embodiments, the EC layer is deposited below the IC layer(s) (e.g., closer to the substrate, closer to the lower TCL), and the CE layer is deposited above the IC layer(s) (e.g., closer to the upper TCL). In other embodiments of the disclosure, the placement of the EC and CE layers may be switched, such that the CE layer is positioned below the IC layer(s) and the EC layer is positioned above the IC layers(s). In such embodiments, the P1 scribe may cut through the CE layer instead of through the EC layer, and the P3 scribe may cut through the TCL closer to the EC layer. Similarly, regarding the above described methods, the electrochromic stack may be formed in the reverse order on the substrate. Thus, the bottom two or three formed layers, depending on the embodiment (i.e., the transparent conductor layer adjacent to the substrate, the CE layer, and in some embodiments the IC layer adjacent to the CE layer), may be cut at location P1.

Although each of the above embodiments illustrates an electrochromic structure between only two busbars, it will be understood that the above disclosure similarly applies to devices having more than two busbars as well. In such devices, each of the busbars may be electrically separated from each other by forming the electrochromic structures as described above. Forming of each of the electrochromic structures may be performed simultaneously or sequentially, and the layers formed between each pair of busbars may be scribed in any of the manners described above.

Lastly, the embodiments described above and illustrated in the figures are not limited to rectangular shaped electrochromic devices. Rather, the descriptions and figures are meant only to depict cross-sectional views of an electrochromic device and are not meant to limit the shape of such a device in any manner. For example, the electrochromic device may be formed in shapes other than rectangles (e.g., circles, etc.). For further example, the electrochromic device may be shaped three-dimensionally (e.g., convex, concave, etc.).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An electrochromic device comprising:
  a lower transparent conductive layer, a first portion of said lower transparent conductive layer coupled to a first conductive element and a second portion, physically separate from the first portion, of said lower transparent conductive layer coupled to a second conductive element;
  a upper transparent conductive layer, a first portion of said upper transparent conductive layer coupled to the first conductive element and a second portion, physically separate from the first portion, of said upper transparent conductive layer coupled to the second conductive element;
  a first electrode layer comprising one of a counter electrode layer and an electrochromic layer, between said lower transparent conductive layer and said upper transparent conductive layer and in contact with each of the first portion and the second portion of said lower transparent conductive layer;
  a second electrode layer comprising the other of the counter electrode layer and the electrochromic electrode layer, between said lower transparent conductive layer and said upper transparent conductive layer;
  an ion-conductor layer for conducting ions between and in communication with said first electrode layer and said second electrode layer, wherein the first portion and second portion of the lower transparent conductive layer are spaced apart more than the migration length of a charge compensating ion occupying the first electrode layer, wherein the ion-conductor extends continuously from the first conductive element to the second conductive element.

2. The device of claim 1, wherein the first portion and second portion of the lower transparent conductive layer are spaced more than about 25 microns apart.

3. The device of claim 1, wherein the first portion and second portion of the lower transparent conductive layer are spaced more than about 50 microns apart.

4. The device of claim 1, wherein the first portion and second portion of the lower transparent conductive layer are spaced more than about 75 microns apart.

5. The device of claim 1, wherein the space between the first portion and second portion of the lower transparent conductive layer is filled at least partially by the first electrode layer.

6. An electrochromic device comprising:
  a lower transparent conductive layer, a first portion of said lower transparent conductive layer coupled to a first conductive element and a second portion, physically separate from the first portion, of said lower transparent conductive layer coupled to a second conductive element;

an upper transparent conductive layer, a first portion of said upper transparent conductive layer coupled to the first conductive element and a second portion, physically separate from the first portion, of said upper transparent conductive layer coupled to the second conductive element;

a first electrode layer comprising one of a counter electrode layer and an electrochromic layer, between said lower transparent conductive layer and said upper transparent conductive layer and in contact with each of the first portion and the second portion of said lower transparent conductive layer;

a second electrode layer comprising the other of the counter electrode layer and the electrochromic electrode layer, between said lower transparent conductive layer and said upper transparent conductive layer;

an ion-conductor layer for conducting ions between and in communication with said first electrode layer and said second electrode layer, wherein the first portion and second portion of the lower transparent conductive layer are spaced apart more than the migration length of a charge compensating ion occupying the first electrode layer, wherein the space between the first portion and second portion of the lower transparent conductive layer is filled at least partially by a third portion of the lower transparent conductive layer that is electrically isolated from each of the first portion and the second portion of the lower transparent conductive layer.

7. The device of claim 6, wherein the first portion and third portion of the lower transparent conductive layer are spaced more than about 25 microns apart, and the second portion and third portion of the lower transparent conductive layer are spaced more than about 25 microns apart.

8. The device of claim 6, wherein the first portion and second portion of the lower transparent conductive layer are spaced more than about 50 microns apart.

9. The device of claim 6, wherein the first portion and second portion of the lower transparent conductive layer are spaced more than about 75 microns apart.

10. The device of claim 6, wherein the respective spaces between the first portion and third portion, and between the second portion and the third portion, of the lower transparent conductive layer are each filled at least partially by the first electrode layer.

11. The device of claim 1, wherein the first conductive electrode layer comprises a first portion coupled to the first conductive element and to the first portion of the lower transparent conductive layer, and a second portion, physically separate from the first portion, coupled to the second conductive element and to the second portion of the transparent conductive layer, wherein the first portion and second portion of the lower transparent conductive layer are spaced apart more than the first portion and second portion of the first electrode layer are spaced apart.

12. The device of claim 11, wherein the first portion and second portion of the lower transparent conductive layer are spaced more than about 50 microns apart.

13. The device of claim 11, wherein the first portion and second portion of the lower transparent conductive layer are spaced more than about 75 microns apart.

14. The device of claim 11, wherein the space between the first portion and second portion of the lower transparent conductive layer is filled at least partially by the ion conductor layer.

15. The device of claim 14, wherein the space between the first portion and second portion of the first electrode layer is filled at least partially by the ion conductor layer.

16. The device of claim 1, wherein the counter electrode layer comprises a mixed tungsten nickel oxide.

17. The device of claim 16, wherein the counter electrode layer further comprises lithium ions.

18. A method for the preparation of an electrochromic device comprising:
depositing a first conductive layer;
cutting the first conductive layer such that a first portion of the first conductive layer is electrically isolated from a second portion of the first conductive layer, wherein the first portion and second portion of the first conductive layer are separated by a space;
depositing one of an electrochromic electrode layer and a counter electrode layer on said first conductive layer and within the space between the first portion and the second portion of the first conductive electrode layer to provide a first deposited electrode that is occupied by a charge compensating ion having a migration length that is shorter than the space between the first portion and second portion of the first conductive layer;
depositing an ion-conductor layer on said first deposited electrode, such that said ion transparent layer is in communication with said first deposited electrode,
depositing the other of said electrochromic electrode layer and said counter electrode layer on said ion-conductor layer to provide a second deposited electrode, and
depositing a second conductive layer on said second deposited electrode.

19. The method of claim 18, wherein the first deposited electrode is deposited over the first and second portions of the first conductive layer, wherein said first and second portions are spaced more than about 25 microns apart.

20. The method of claim 19, wherein said first and second portions are spaced more than about 50 microns apart.

21. The method of claim 18, wherein, in a finished device, the ion-conductor layer extends continuously from a first conductive element electrically connected to the first portion of the first conductive layer to a second conductive element electrically connected to the second portion of the first conductive.

22. The method of claim 18, wherein depositing one of an electrochromic electrode layer and a counter electrode layer is performed using physical vapor deposition.

23. The method of claim 18, further comprising: cutting the second portion of the first conductive layer such the first conductive layer is divided into three electrically isolated portions, one of said portions being a middle portion positioned between the other two outer portions.

24. The method of claim 23, wherein the space between the middle portion and each of the outer portions filled at least partially by the first electrode layer.

25. The method of claim 18, wherein the cutting step is performed before the first electrode layer is deposited on the first conductive layer, and a second cutting step is performed after the first electrode layer is deposited on the first conductive layer such that first electrode layer comprises a first portion coupled to the first portion of the first conductive layer, and a second portion, physically separate from the first portion, coupled to the second portion of the first conductive layer, and such that the first portion and second portion of the first conductive layer are spaced apart more than the first portion and second portion of the first electrode layer are spaced apart.

26. The method of claim 25, wherein the second cutting step forms a space greater than 25 microns between the first portion and second portion of the first electrode layer.

27. The method of claim 25, wherein the space between the first portion and second portion of the first conductive layer is filled at least partially by the ion conductor layer.

28. The method of claim 26, wherein the space between the first portion and second portion of the first electrode layer is filled at least partially by the ion conductor layer.

29. The method of claim 18, wherein the step of depositing the counter electrode layer further comprises depositing a mixed tungsten nickel oxide.

* * * * *

UNITED STATES PATENT AND TRADEMARK OFFICE
CERTIFICATE OF CORRECTION

PATENT NO. : 9,152,001 B2  
APPLICATION NO. : 13/950791  
DATED : October 6, 2015  
INVENTOR(S) : Mark Samuel Burdis et al.

Page 1 of 1

It is certified that error appears in the above-identified patent and that said Letters Patent is hereby corrected as shown below:

In the Claims
Column 14, lines 43 and 44, please delete "first conductive" and insert --first conductive layer--

Signed and Sealed this
Tenth Day of May, 2016

Michelle K. Lee
*Director of the United States Patent and Trademark Office*